Jan. 3, 1928.

R. A. BARTHOLOMEW 1,654,911

CLUTCH

Filed Dec. 18, 1925    2 Sheets-Sheet 2

INVENTOR
Raymond A. Bartholomew
BY
Synnestvedt & Lechner
ATTORNEYS

Patented Jan. 3, 1928.

1,654,911

UNITED STATES PATENT OFFICE.

RAYMOND A. BARTHOLOMEW, OF BRONX, NEW YORK.

CLUTCH.

Application filed December 18, 1925. Serial No. 76,155.

This invention relates to clutches and is particularly useful in automotive vehicles.

The primary object is to provide an improved clutch of simple construction which is easy to operate, and has, among other things, the advantages hereinafter pointed out.

How the foregoing, together with such other objects and advantages as may hereinafter appear or are incident to my invention, are realized, is illustrated in preferred form in the accompanying drawings, wherein—

Figure 1:
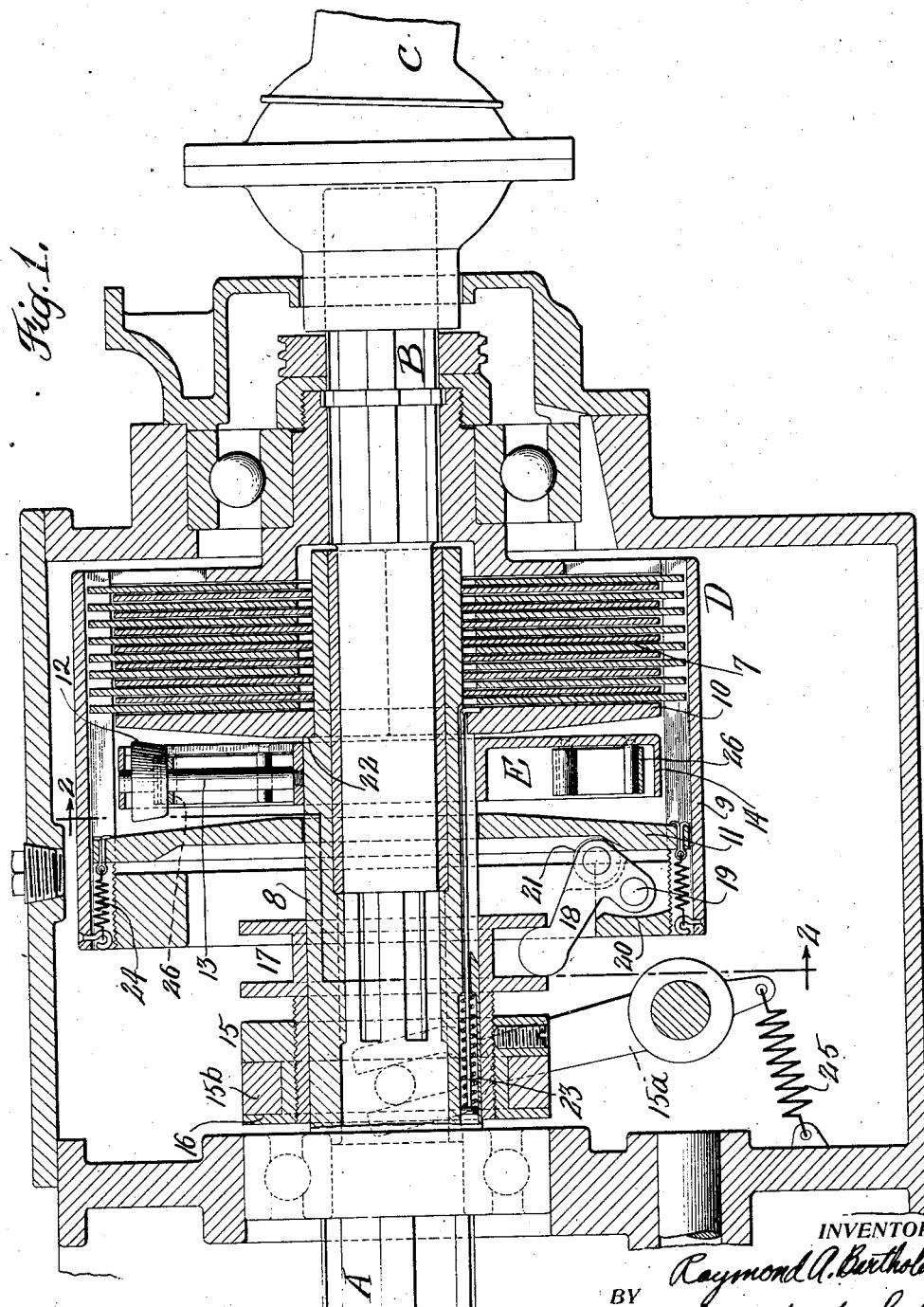
Fig. 1 is a longitudinal section of the device with certain of the parts shown in elevation and taken substantially on the line 1—1 of Fig. 2.

In this specification my invention will be described in connection with an automotive vehicle, although it may be advantageously used in connection with other forms of torque transmitting devices.

Referring to the drawings the reference letter A indicates a driving shaft connected to the source of motive power, in this instance to the engine of the automotive vehicle, B the driven shaft connected to a device to be driven, in this instance to the differential through the medium of the universal shaft C, and the reference letter D indicates in general the clutch through the medium of which the shafts A and B are connected for rotation.

The clutch D comprises a plurality of alternate steel and bronze plates or discs 7, alternate plates being connected for rotation with the sleeve 8 and the drum 9, respectively. The sleeve 8 is keyed to the driving shaft A and the drum 9 is keyed to the driven shaft B. Thus it will be seen that when the discs are brought into frictional contact a driving connection is established between the two shafts.

I propose to bring the clutch discs into frictional contact very gradually so as to ensure smooth acceleration of the driven shaft through the employment of the mechanism indicated as a whole by the reference letter E and to be hereinafter fully described, said mechanism also functioning to press the friction members together with sufficient pressure to transmit the required torque and to increase the pressure as the torque increases, thus preventing slippage of the clutch with its consequent burning out of the discs or friction elements.

Figure 2:
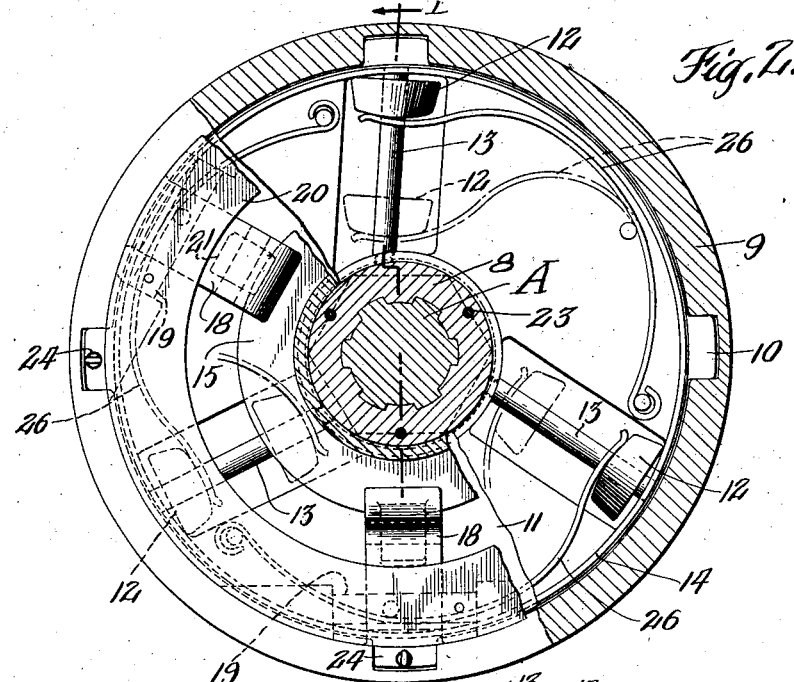
Fig. 2 is in part a cross section and in part an elevation taken substantially on the line 2—2 of Fig. 1.

The mechanism E comprises a driving member 10 splined to the driving sleeve 8; a driven member 11 splined to the drum 9, the members 10 and 11 being in the form of relatively flat cones, preferably of hardened steel, positioned with their apices facing each other and spaced apart; and the tapered rollers 12 slidably mounted on the pins 13 of which there are preferably three, which pins are, in turn, mounted on the carrier 14 positioned between the members 10 and 11. Referring to Fig. 2 it will be seen that the pins 13 are so disposed that their axes are not radial but are somewhat inclined, in other words, the axes of the pins are so disposed that if they were extended they would be tangential to a small circle concentric to the axis of the shafts A and B and the members 10 and 11. The purpose of this relation of the pins will appear hereinafter.

The application, control and operation of the clutch is as follows.

Mounted slidably and idly on the driving sleeve 8 is a grooved clutch collar 15 adapted to be moved back and forth on the sleeve by a clutch fork 15ª engaging the groove 16 in the collar 15 through the medium of the ring member 15ᵇ.

A second groove 17 is provided in the collar 15 operating on the dogs 18, of which there are preferably three, said dogs being pivoted about pins 19 in the ring 20, which ring is screw threaded into the end of the drum 9. These dogs are each provided with a roller 21 adapted to contact with the driven member 11 of the mechanism E.

Referring to the position of the device as shown in Fig. 1, it will be seen that the clutch is disengaged, in which position the friction discs 7 are not in frictional contact and the mechansm E is in its inoperative position. In this position the driving member 10 is pulled against the shoulder 22 on the sleeve 8 by the spring devices 23, and the driven member 11 is pulled against the rollers 21 of the dogs 18 by the springs 24, the clutch collar 15 having been moved to the left by manual operation of the clutch fork 15ª.

Figure 3:
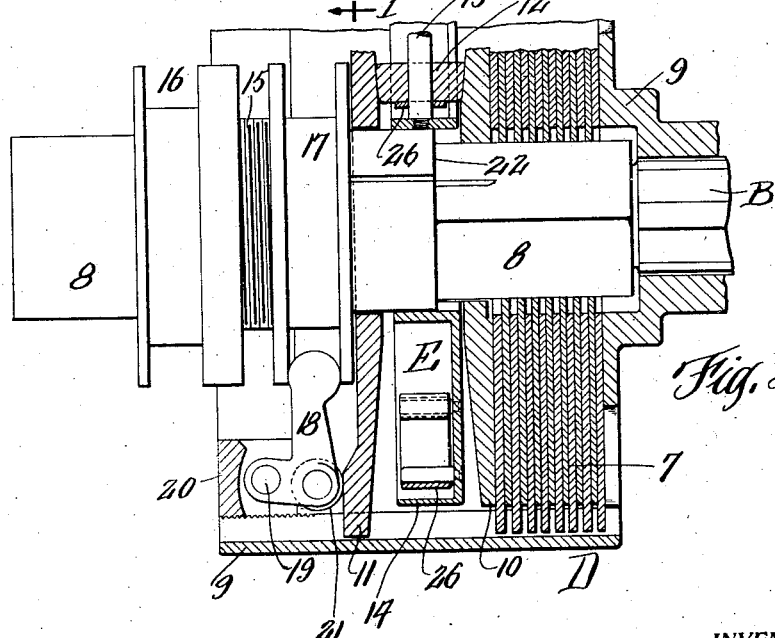
Fig. 3 is a fragmentary longitudinal section similar to Fig. 1 but showing another position of the device.

Upon releasing the cluch fork 15ª the collar 15 is moved to the right under influence of the spring 25 which causes the dogs 18 to assume the position indicated in Fig. 3. The dogs by virtue of their engagement with the driven member 11, cause it to be moved to the right bringing its conical surface into contact with the rollers 12 and moving said rollers and the carrier 14 with it until contact is made with the driving member 10. It is here pointed out that the dogs will have assumed a past center position, thus locking them in such position until further operation of the clutch collar. This is clearly shown in Fig. 3. It is also pointed out that the spring 25 may be very light as its work is merely to move the clutch collar, the dogs and the relatively light member 11.

With the parts in the above position it will be seen that since one conical member revolves with the driving shaft and the other with the drum, relative motion exists between the two, and since the three rollers are guided by their pins and adapted to rotate bodily with the carrier on the sleeve 8, contact between the members and the rollers results in rotation of the rollers about their own axes and rotation of the carrier about the axis of the clutch at a speed half-way between that of the members. This coupled with the fact that the roller pins are inclined as hereinbefore described causes the rollers to describe a path on the face of the members in the form of a spiral approaching the center, that is, the apices of the plates or members 10 and 11, and this at a speed depending on the inclination of the roller axes and the speed of the driving shaft A.

This movement forces the members 10 and 11 apart and produces frictional contact between the clutch discs causing the difference between the speeds of the driving and driven plates to approach zero which it finally reaches when sufficient pressure has been applied to the clutch discs to transmit the required torque. In this connection it is pointed out that any increase in torque will result in a tendency for the clutch to slip, hence relative motion between the driving and driven members, a further approach of the rollers toward the center, additional separation of the conical members, and greater pressure on the clutch plates until equilibrium is again reached.

Upon moving the clutch collar 15 to the left the various parts separate and the rollers 12 move toward the rim of the carrier 14 under influence of the leaf springs 26, which springs are anchored to the carrier 14 in any suitable manner (see Fig. 2).

In the event of wear in the clutch plates or associated parts an adjustment of position of the dogs 18 may be effected by moving the screw threaded ring 20 in or out as the case may be, an adjustment of equal amount and opposite in direction being made of that portion of the clutch collar 15 having the groove 16, for which purpose this portion of the collar is screw threaded to the other portion thereof.

While I have described my invention in connection with a multiplate disc clutch it is to be understood that the advantages thereof may be derived in connection with other types of clutches as, for example, cone clutches.

From the foregoing it will be seen that the clutch elements are not subject to burning out because of the fact that immediately the clutch tends to slip the friction between the clutch elements is increased to transmit the required torque.

Through the practice of my invention the usual thrust bearings and heavy springs are eliminated and the clutch may be applied or released with a minimum of effort. Heavy loads may be transmitted for the size of clutch used as it is possible to apply high pressure to the discs with little effort.

It is also pointed out that the clutch is automatically gradually applied, there being a time interval between operation of the controlling element and actual engagement of the clutch in proportion to the speed of the driving element, under the rotating influence of which the clutch is gradually applied.

As shown the clutch is mounted in the transmission case and is subjected to a bath of oil.

What I claim is:—

1. In a clutch, the combination of a driving element, a driven element movable toward and from the driving element, said elements having conically formed adjacent surfaces, and a plurality of rollers interposed between said elements and movable toward and from the axis of rotation of said elements on axes tangential to a circle concentric with the axis of said elements.

2. In a clutch, the combination of a conical driving element; a conical driven element movable toward and from the driving element, the conical surfaces of said elements being adjacent; and means between said elements adapted to cause gradual engagement of the clutch including a rotatable carrier, a plurality of pins mounted on said carrier and having their axes tangential to a circle concentric with the axis of said carrier, and a plurality of rollers slidably carried by the pins.

3. The combination of a driving shaft, a driven shaft, a friction clutch, a cone-shaped disc mounted to rotate with the driving shaft but longitudinally movable therealong, and normally idle rollers adapted to be moved to engage the inclined face of the cone shaped disc and move it against the clutch to cause engagement thereof, said rollers riding inwardly along the inclined surface under the influence of the rotating cone whereby to cause gradual engagement of the clutch.

4. A clutch comprising in combination a driving element; a driven element; a multiplicity of discs, alternate discs being adapted to rotate with the driving and driven elements respectively; a pair of spaced conical members having their apices facing each other, one being adapted to rotate with the driving element and the other with the driven element, both however being slidable longitudinally of said elements, and a plurality of rollers between said conical members adapted to engage said members upon longitudinal movement of the driven conical member, the axes of said rollers being so disposed that said engagement causes said rollers to travel toward the apices of the conical members whereby to gradually engage the discs with one another.

In testimony whereof I have hereunto signed my name.

RAYMOND A. BARTHOLOMEW.